(12) United States Patent
Straeussnigg (10) Patent No.: US 7,991,069 B2
(45) Date of Patent: Aug. 2, 2011

(54) METHOD FOR ADAPTING FILTER CUT-OFF FREQUENCIES FOR THE TRANSMISSION OF DISCRETE MULTITONE SYMBOLS

(75) Inventor: Dietmar Straeussnigg, Villach (AT)

(73) Assignee: Lantiq Deutschland GmbH, Neubiberg (DE)

( * ) Notice: Subject to any disclaimer, the term of this patent is extended or adjusted under 35 U.S.C. 154(b) by 1202 days.

(21) Appl. No.: 10/175,332

(22) Filed: Jun. 19, 2002

(65) Prior Publication Data
US 2003/0026352 A1 Feb. 6, 2003

(30) Foreign Application Priority Data
Jun. 19, 2001 (DE) .................................. 101 29 317

(51) Int. Cl.
*H04L 27/00* (2006.01)
(52) U.S. Cl. ........ 375/295; 375/259; 375/260; 375/286; 375/299; 375/306; 375/307; 375/316; 375/347; 370/206; 370/207; 370/208; 370/209; 370/210; 370/211
(58) Field of Classification Search .................. 370/480, 370/276, 282, 493, 517, 206–211; 375/222, 375/229, 230–232, 259–260, 316, 346, 295, 375/286, 306–307, 347, 219, 299
See application file for complete search history.

(56) References Cited

U.S. PATENT DOCUMENTS
| | | | | |
|---|---|---|---|---|
| 5,317,596 | A | 5/1994 | Ho et al. | 375/14 |
| 6,563,841 | B1 * | 5/2003 | Nedic et al. | 370/480 |
| 6,614,374 | B1 * | 9/2003 | Gustavsson et al. | 341/143 |
| 6,707,913 | B1 * | 3/2004 | Harrison et al. | 379/413.02 |
| 2002/0141440 | A1 * | 10/2002 | Stanley et al. | 370/465 |

FOREIGN PATENT DOCUMENTS
EP  0 820 168 A2  1/1998

OTHER PUBLICATIONS

Wolfgang H. Gerstacker et al., *Blind Equalization Techniques for xDXL Using Channel Coding and Precoding*, Int. J. Electron. Commun. No. 4, (1999), pp. 194-204.
G. Soder, *Optimization and Comparison of Binary and Multi-level Digital Upper Carrying Systems with and without Quantized Skirt Coupling*, Communications-Engineering Report, Mar. 1981, pp. 181-226.

* cited by examiner

*Primary Examiner* — Chieh M Fan
*Assistant Examiner* — Sophia Vlahos
(74) *Attorney, Agent, or Firm* — Maginot, Moore & Beck (57) ABSTRACT

A method for adapting filter cut-off frequencies for the transmission of discrete multitone symbols, where a transmit symbol datastream consisting of discrete multitone symbols is applied to an interpolation device, the transmit symbol datastream is interpolated with a symbol rate in the interpolation device, an interpolated symbol datastream is filtered in a first low-pass filtering device in accordance with a first filter cut-off frequency, which can be predetermined by a first filter cut-off frequency determining device, a digital symbol datastream obtained after a digital-analog conversion, transmission and analog-digital conversion, is filtered at the receiver end in a second low-pass filtering device in accordance with a second filter cut-off frequency, which can be predetermined by a second filter cut-off frequency determining device, in order to provide an equalized symbol datastream, the equalized symbol datastream is decimated in a decimation device and the decimated received symbol datastream consisting of discrete multitone symbols is provided to a multitone receiver device.

19 Claims, 5 Drawing Sheets

METHOD FOR ADAPTING FILTER CUT-OFF FREQUENCIES FOR THE TRANSMISSION OF DISCRETE MULTITONE SYMBOLS

The present invention relates to a method for transmitting an analog datastream and, in particular, relates to a method for adapting filter cut-off frequencies for the transmission of discrete multitone symbols, in which method transient effects are reduced.

Multicarrier systems consisting of a large number of orthogonal quadrature-amplitude modulated (QAM) carriers are normally provided for transmitting analog datastreams. Such transmission systems and methods are described, for example, in "J. Bingham, Multicarrier modulation for data transmission: an idea whose time has come, IEEE Commun. Mag., Vol. 28, May 1990, pp. 5-14". In discrete multitone modulation (DMT), a time domain equalizer is normally used for restricting the length of the channel to less than the length of one cyclic prefix (described in detail below). Usually, a multitone method (DMT—Discrete Multitone) is used for asymmetric datastream transmission via normal telephone lines, normal telephone lines usually being constructed as asymmetric digital subscriber lines (ADSL).

High-speed digital subscriber lines of the prior art are described, for example, in the publication "High-speed digital subscriber lines, IEEE Journal Sel. Ar. In Comm., Vol. 9, No. 6, August 1991". Among the transmission methods with a high data rate, which are based on digital subscriber lines (DSL), a number of VDSL (Very High Data Rate DSL) arrangements are known and, for example, methods such as carrierless amplitude/phase (CAP), discrete wavelet multitone (DWMT), single line code (SLC) and discrete multitone (DMT) can be used for these. In the DMT method, the transmit signal is provided from multiple sinusoidal or cosinusoidal signals, where both the amplitude and the phase can be modulated of each individual sinusoidal or cosinusoidal signal. The multiple modulated signals thus obtained are provided as quadrature-amplitude modulated (QAM) signals.

Figure 4:
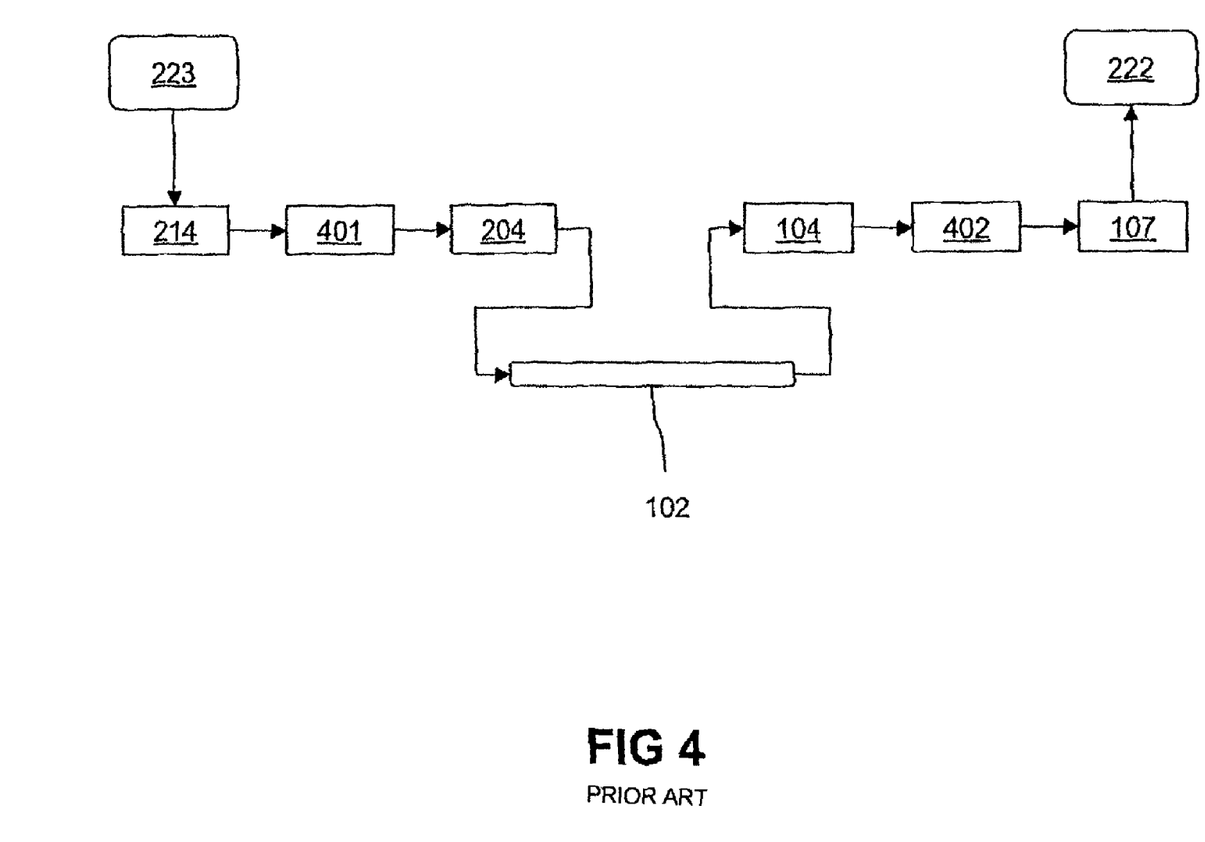
FIG. 4 shows a circuit arrangement of a conventional multitone transmission system with a first fixed low-pass filter and a second fixed low-pass filter.

FIG. 4 shows a conventional arrangement for transmitting discrete multitone (DMT) symbols from a multitone transmitter device 223 to a multitone receiver device 222. In the method of the prior art shown, a datastream consisting of multitone symbols is input by the multitone transmitter device 223 into an interpolation device 214. The datastream interpolated by the interpolation device 214 is then supplied to a first low-pass filter 401 which has a fixed cut-off frequency and provides filtering of the interpolated symbol datastream.

In a subsequent digital-analog converter 204, the filtered digital datastream is converted into an analog datastream and transmitted via a transmission channel 102. The transmitted analog datastream is reconverted into a digital datastream in an analog-digital converter 104 and supplied to a second fixed low-pass filter 402 which has a second fixed cut-off frequency.

Finally, the filtered digital datastream transmitted is supplied to a decimation device 107 in which the digital datastream is decimated. The decimated datastream is forwarded as a received symbol datastream to the multitone receiver device 222 in which further processing of the received symbol datastream is performed.

An essential disadvantage of data transmission according to the DMT method via lines, for example twisted copper wire lines, consists in that long transient effects occur which limit a transmittable bandwidth.

Furthermore, it is unsuitable that fixed low-pass filters are used in order to limit the bandwidth of the analog datastream to be transmitted and to limit out-of-band noise in analog-digital and digital-analog converters which can be constructed, for example, as sigma-delta converters.

In particular, it is disadvantageous that, when low-pass filters are excited with DMT signals, transient effects can occur which have considerable spectral components above the intended transmission band in a frequency range.

A further disadvantage of conventional methods and circuit arrangements for transmitting analog datastreams which have multitone signals consists in that in the transmission signal band convolution products occur which cannot be eliminated by a multitone receiver device.

It is also unsuitable that these convolution products are contained as interference signals in the transmission signal band as a result of which the quality of transmission is impaired and the bandwidth is limited.

It is thus an object of the present invention to provide a method and a circuit arrangement for transmitting analog datastreams in which transient effects are reduced.

According to the invention, this object is achieved by the method specified in claim 1 and by a circuit arrangement having the features of claim 10.

Further developments of the invention are obtained from the subclaims. An essential concept of the invention consists in low-pass filtering of an interpolated symbol datastream in a first low-pass filtering device according to a first filter cut-off frequency, which can be variably predetermined by a first filter cut-off frequency determining device, and filtering a received digital symbol datastream in a second low-pass filtering device in accordance with a second filter cut-off frequency which is variably predeterminable by a second filter cut-off frequency determining device.

It is thus an advantage of the present invention that transient effects can be reduced in a transmission of analog datastreams which are built up from multi tone symbols.

It is also advantageous that low-pass filtering is provided variably based on one design of a DMT transmission system.

The method according to the invention for adapting filter cut-off frequencies for the transmission of discrete multitone symbols essentially comprises the following steps:

a) applying a transmit symbol datastream consisting of discrete multitone symbols, which is provided by a multitone transmitter device, to an interpolation device to which a symbol rate is applied;

b) interpolating the symbol datastream with the symbol rate in the interpolation device in order to provide an interpolated symbol datastream;

c) low-pass filtering of the interpolated symbol datastream in a first low-pass filtering device according to a first filter cut-off frequency, which can be variably or adaptively predetermined by a first filter cut-off determining device, in order to provide a filtered symbol datastream;

d) converting the filtered symbol datastream into an analog datastream in a digital-analog converter, in order to provide an analog datastream via [sic] a transmission via a transmission channel;

e) transmitting the analog datastream via the transmission channel;

f) converting the transmitted analog datastream into a digital symbol datastream in an analog-digital converter;

g) low-pass filtering the digital symbol datastream in a second low-pass filtering device in accordance with a second filter cut-off frequency, which can be variably or adaptively predetermined by a second filter cut-off frequency determining device, in order to provide an equalized symbol datastream;

h) decimating the equalized symbol datastream in a decimation device; in order to provide a decimated received symbol datastream consisting of discrete multitone symbols; and i) delivering the received symbol datastream to a multitone receiver device in which the received datastream is analyzed or processed further.

The subclaims contain advantageous further developments and improvements of the respective subject matter of the invention.

According to a preferred further development of the present invention, the first filter cut-off frequency, which is predeterminable by the first filter cut-off frequency determining device, is variably adjusted during low-pass filtering of the interpolated symbol datastream in the first low-pass filtering device.

According to a further preferred further development of the present invention, the first filter cut-off frequency, which is predeterminable by the first filter cut-off frequency determining device, is adaptively adjusted in accordance with the multitone symbol to be transmitted, during low-pass filtering of the interpolated symbol datastream in the first low-pass filtering device.

According to yet another preferred development of the present invention, the second filter cut-off frequency, which is predeterminable by the second filter cut-off frequency determining device, is variably adjusted in the second low-pass filtering device during low-pass filtering of the digital symbol datastream which is obtained from the analog-digital converter.

According to yet another preferred development of the present invention, the second filter cut-off frequency, which is predeterminable by the second filter cut-off frequency determining device, is adaptively adjusted in the second low-pass filtering device during low-pass filtering of the digital symbol datastream which is obtained from the analog-digital converter.

According to yet another preferred development of the present invention, the filtered symbol datastream is oversampled with a sampling rate during a conversion of the filtered symbol datastream into the analog datastream in the digital-analog converter.

According to yet another preferred development of the present invention, the transmitted analog datastream is oversampled with a sampling rate during a conversion of the transmitted analog datastream into the digital datastream in the analog-digital converter.

According to yet another preferred development of the present invention, the first filter cut-off frequency of the first low-pass filtering device is changed during the cyclic prefix by the first filter cut-off frequency determining device.

According to yet another preferred development of the present invention, the second filter cut-off frequency of the second low-pass filtering device is changed during the cyclic prefix of a DMT symbol.

The circuit arrangement according to the invention for adapting filter cut-off frequencies for the transmission of discrete multitone symbols also exhibits the following:

a) a multitone transmitter device for providing a transmit symbol datastream consisting of discrete multitone symbols;

b) an interpolation device for interpolating the transmit symbol datastream consisting of discrete multitone symbols, in order to provide an interpolated symbol datastream;

c) a first filter cut-off frequency determining device for providing a first filter cut-off frequency which is variably or adaptively predeterminable;

d) a first low-pass filtering device for low-pass filtering of the interpolated symbol datastream in accordance with the first filter cut-off frequency predetermined by the first filter cut-off frequency determining device, in order to provide a filtered symbol datastream;

e) a digital-analog converter for converting the filtered symbol datastream into an analog datastream;

f) a transmission channel for transmitting the analog datastream;

g) an analog-digital converter for converting the transmitted analog datastream into a digital symbol datastream, the analog-digital converter operating at a predeterminable sampling rate;

h) a second filter cut-off frequency determining device for providing a second filter cut-off frequency for a second low-pass filtering device;

i) a second low-pass filtering device for low-pass filtering of the digital symbol datastream in accordance with a second filter cut-off frequency predetermined by the second filter cut-off frequency determining device; in order to provide an equalized symbol datastream;

j) a decimation device for decimating the equalized symbol datastream in order to provide a decimated received symbol datastream consisting of discrete multitone symbols; and k) a multitone receiver device for further processing of the received symbol datastream.

BRIEF DESCRIPTION OF THE DRAWINGS

Exemplary embodiments of the invention are explained in greater detail in the description following and represented in the drawings, in which.

DETAILED DESCRIPTION OF THE PREFERRED EMBODIMENTS

In the figures, identical reference symbols designate identical or functionally equal components or steps.

Figure 2A:
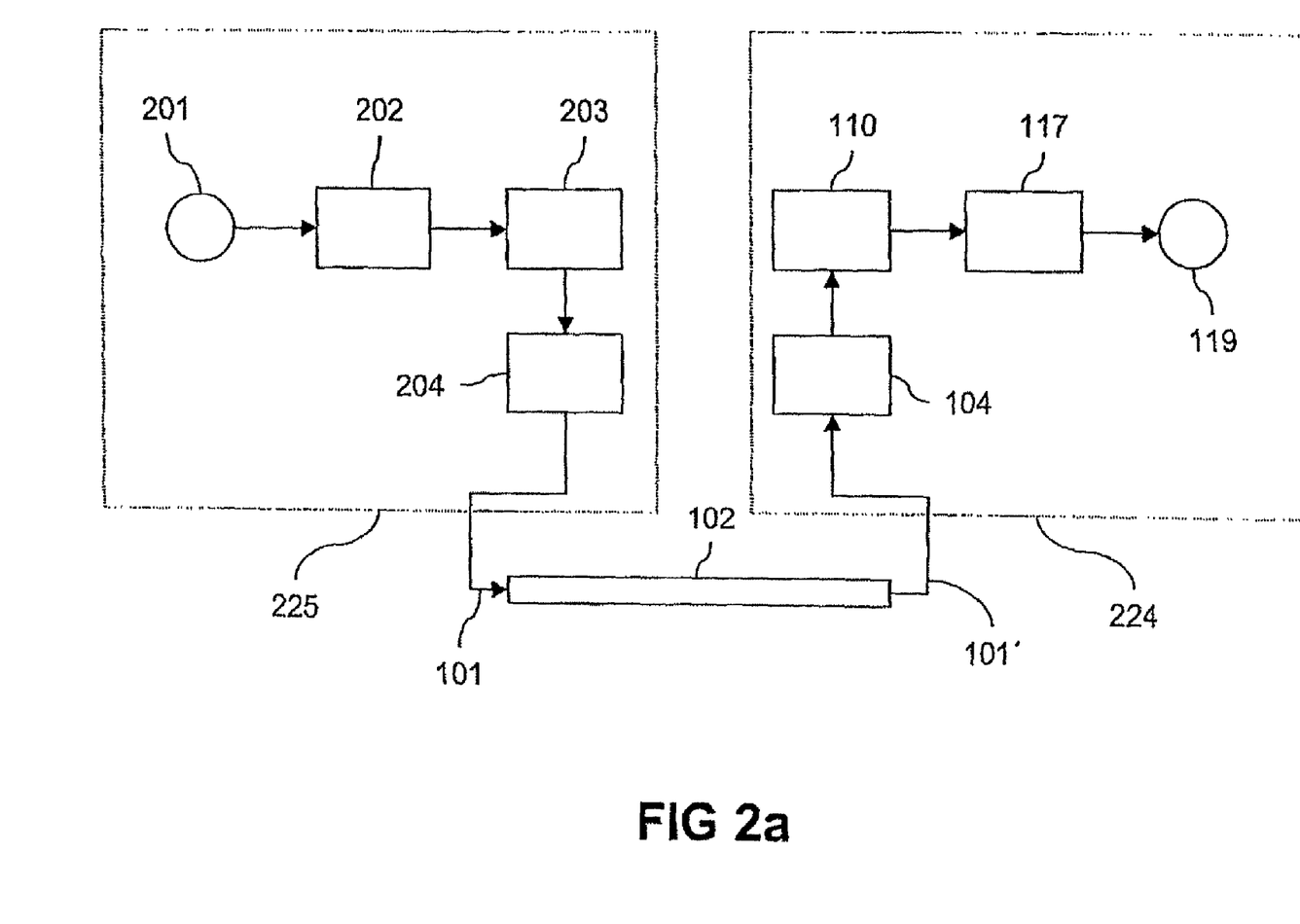
FIG. 2a shows a block diagram of a DMT transmission link with datastream transmitter, transmission channel and datastream receiver.

FIG. 2a shows a basic block diagram of an arrangement for transmitting an analog datastream according to the DMT method, the datastream transmitter 210, the transmission channel 102 and the datastream receiver 211 being illustrated.

Datastream transmitter 225 and datastream receiver 224 consist of separately identifiable blocks which will be briefly described in the text which follows. A data input device 201 is used for inputting data to be transmitted, the input data being forwarded to a coding device 202. In the coding device 202, the datastream is decoded in accordance with a conventional method and supplied to a retransformation device 203.

The retransformation device 203 provides a transformation of data present in the frequency domain into data present in the time domain. The retransformation device 203 can be provided, for example, by a device in which an inverse fast Fourier transformation (IFFT) is performed.

It should be pointed out that the transformation from the frequency domain into the time domain performed in the retransformation device 203 represents a transformation which is inverse to the transformation performed by the transformation device 110.

Finally, the digital datastream output by the retransformation device 203 is converted into an analog datastream by means of a digital-analog converter 204. The analog datastream, which is now present in the time domain, is supplied to a transmission channel 102 which provides the data transmission described above, and for the transmission, there can be band-pass filtering, high-pass filtering and/or low-pass filtering and an application of noise to the analog datastream 101. The analog datastream 101 is furthermore supplied to the analog-digital converter 104 arranged in the datastream receiver 211, which converts the received analog datastream 101 into a digital datastream 103, the converted digital datastream 103 being supplied to the transformation device 110.

After a transformation, which is the inverse to that in the retransformation device 203, from the frequency domain into the time domain, the transformed datastream, after passing through a correction device (not shown) and a determining device (not shown), is decoded in the decoding device 117. The decoded datastream is finally output via the data output device 119.

Figure 2B:
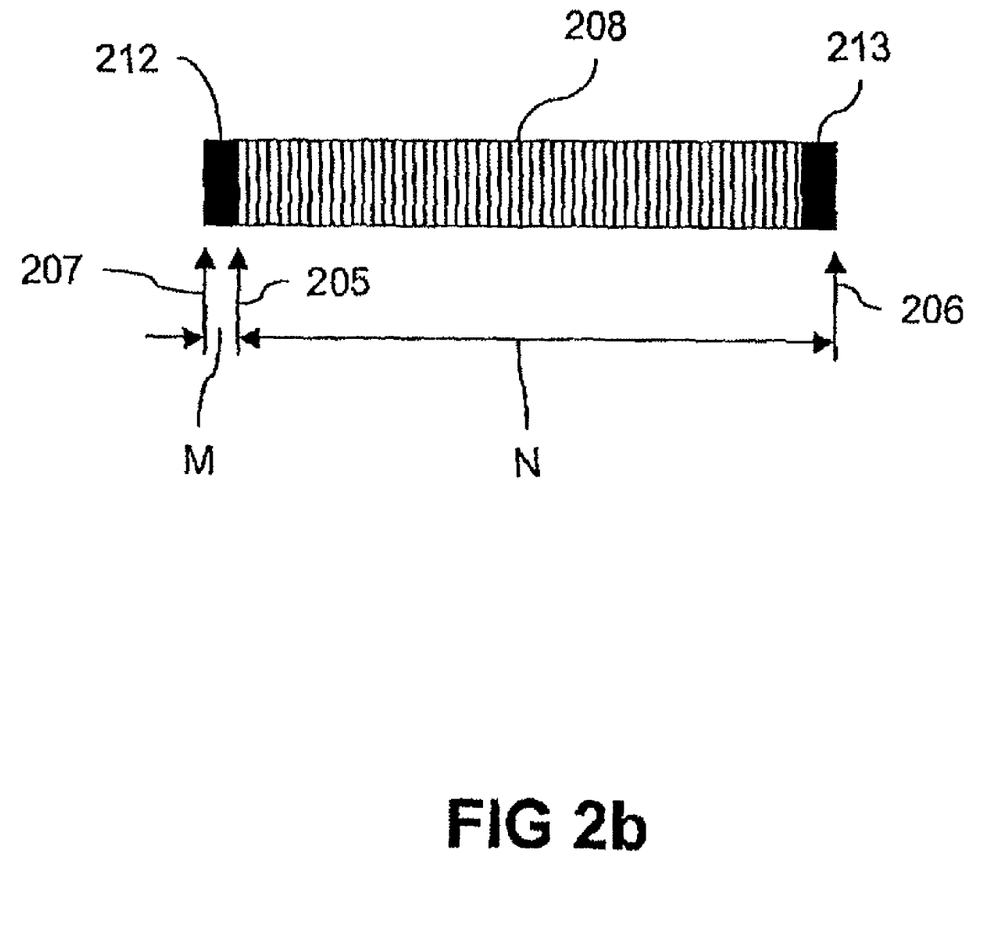
FIG. 2b shows the structure of a discrete multitone symbol preceded by a cyclic prefix.

FIG. 2b shows an arrangement of a discrete multitone symbol, the analog datastream to be transmitted being provided as a sequence of multitone symbols. Before the data transformed in the transformation device 203 are forwarded to the digital-analog converter 204, the last M samples of a multitone symbol are again appended to the start of the block which defines a cyclic prefix and where the following applies:

M<N

This makes it possible to simulate a periodic signal for a datastream receiver if the transient effect caused by the transmission channel has decayed after M samples, i.e. there is no inter-symbol interference (ISI).

As shown in FIG. 2b, the original multitone symbol has a length of N samples, for example N=64 whereas, for example, the last four values are placed at the start of the DMT symbol 205 as a cyclic prefix 212, where:

M=4.

The total length of a multitone symbol 208, together with the end of DMT symbol values 213 appended to the start of the symbol 205, is then M+N from the start of prefix 207 to the end of DMT symbol 206.

It should be pointed out that the number of end of DMT symbol values 213 cyclically appended to the start of symbol 205 must be kept as small as possible, i.e. M<<N in order to obtain the least possible reduction in transmission capacity and quality.

In another example, a multitone symbol 208 consists of 256 complex numbers which means that 512 time samples (real and imaginary component) must be transmitted as a periodic signal. In this example, if a total of 32 end of DMT symbol values 213 are copied to the start of the symbol as cyclic prefix 212, to be total length of the time sample to be transmitted is calculated to be 544; which results in a sampling period $T_A$ of $544 \times 10^{-6}/2.208$ s or 0.25 ms, at a maximum tone frequency of a DMT signal of 2.208 MHz, the symbol transmission frequency being calculated from $f_{DMT}=1/T_A \approx 4$ kHz.

Figure 3:
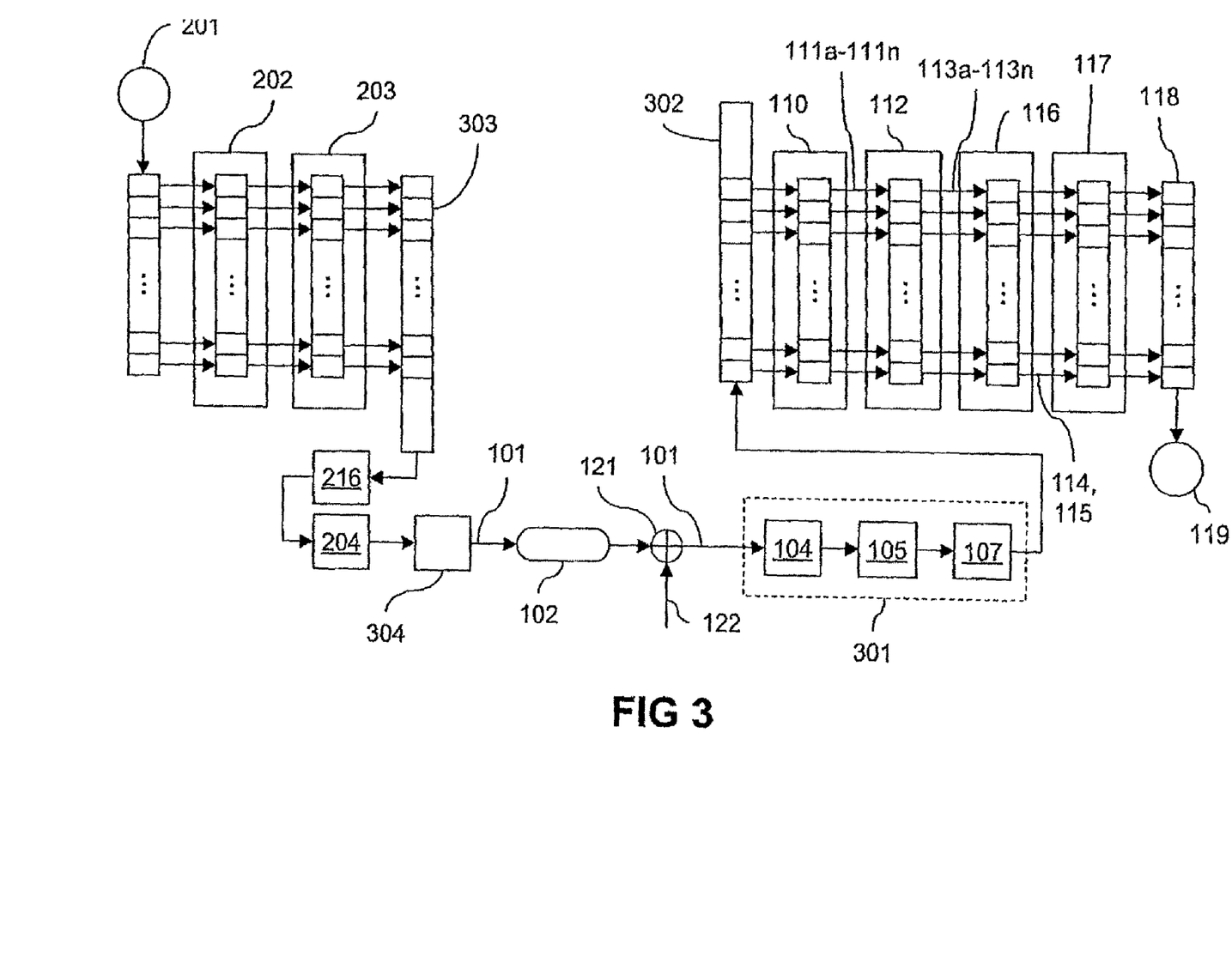
FIG. 3 shows the transmission arrangement for transmitting the analog datastream, illustrated in FIG. 2a, in greater detail as a complete link.

FIG. 3 shows a method for transmitting an analog datastream and a circuit arrangement in a more detailed representation.

The datastream supplied to the data input device 201 is combined into blocks and a certain number of bits to be transmitted is allocated to a complex number depending on scaling. In the coding device 202, finally, coding takes place in accordance with the selected scaling, the coded datastream finally being supplied to the retransformation device 203.

A multitone signal 303 provided by the retransformation device 203 finally forms a digital transmitter datastream which has been transformed from the frequency domain into the time domain. The multitone signal 303 formed as a digital datastream is finally converted into an analog datastream in the digital-analog converter 204 and supplied to a line driver device 304.

The line driver device 304 amplifies or drives, respectively, the analog datastream 101 to be transmitted into a transmission channel 102, the channel transfer function of which is known in principle or can be measured. In the transmission channel, noise is also superimposed on the analog datastream which is shown by a superposition device 121 in FIG. 3. The superposition device 121 is supplied with the analog datastream transmitted from the transmission channel and with a noise signal 122 so that, finally, an analog datastream 101 is obtained on which noise is superimposed.

Figure 1:
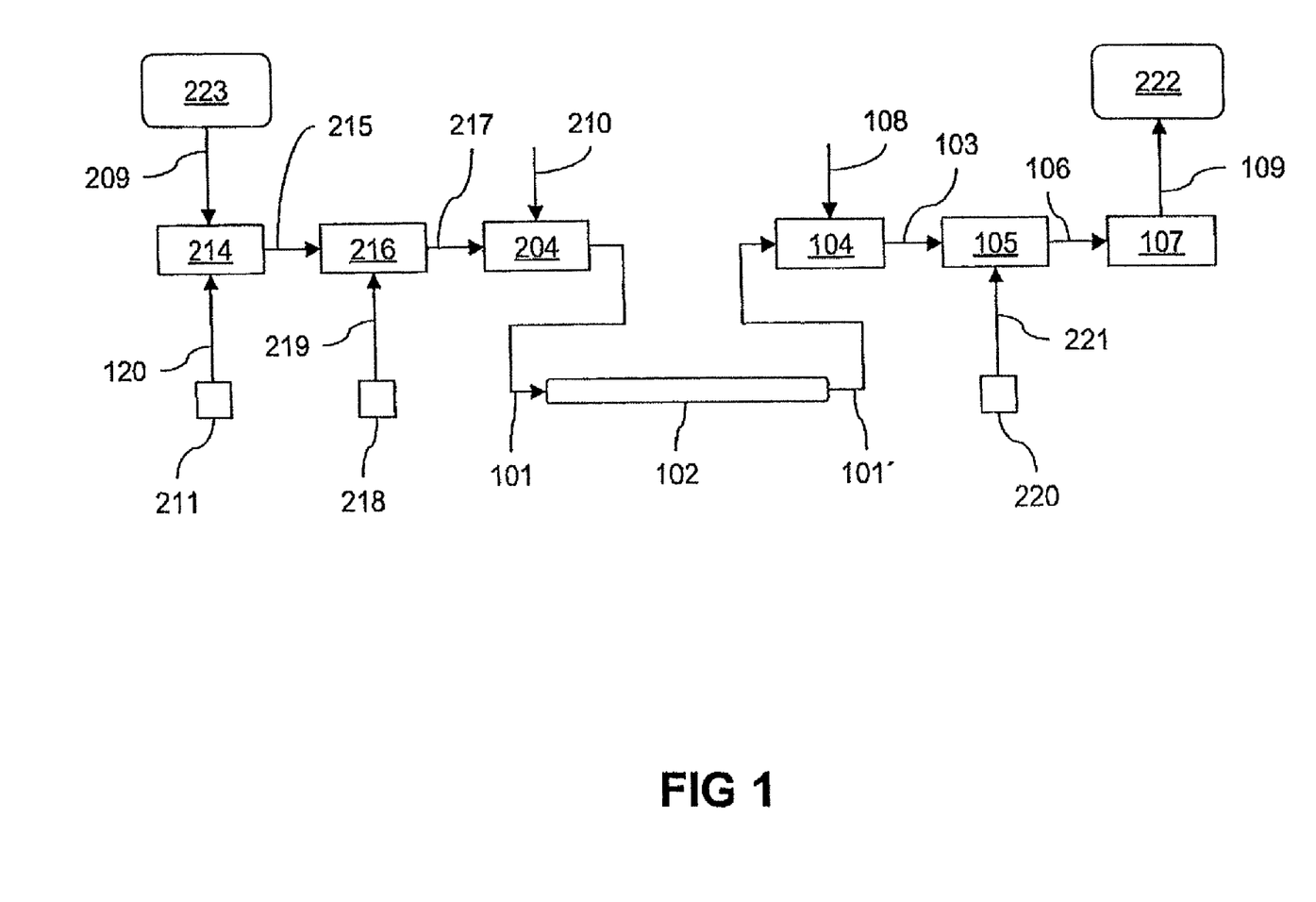
FIG. 1 shows a circuit arrangement for transmitting data by means of the multitone method from a multitone transmitter device to a multitone receiver device according to an exemplary embodiment of the present invention.

The analog datastream 101 is supplied to a preprocessing device 301 which, according to the invention, contains the analog-digital converter 104 shown in FIG. 1, the second low-pass filtering device 105 and the decimation device 107 in the order shown in FIG. 1.

A preprocessed digital datastream 302 output by the preprocessing device 301 is finally supplied to the circuit units of the datastream receiver. The transmitted analog datastream 101', which has been transmitted via a transmission channel 102 which can be noisy, is supplied to an analog-digital converter 104 which samples the analog datastream 101 with a sampling rate 108, an equidistant sampling of the transmitted analog datastream 101' being provided. The analog-digital converter 104 converts the transmitted analog datastream 101' into a digital symbol datastream 103 which, in turn, is supplied to a second low-pass filtering device 105.

The transformation device 110 provides a transformation of the decimated equalized digital datastream 109 into transformation signals 111a-111n, where n represents the maximum number, 256 in the present example, of the cosinusoidal or sinusoidal signals defined in amplitude and phase. It should be pointed out that the transformation device 110 performs a digital transformation of a signal which is digitally present in the time domain into a signal which is digitally present in the frequency domain.

The transformation signals 111a-111n correspond, for example, to complex numbers for each of the multitones, evaluation being provided in amplitude and phase or, respectively, as a real component and imaginary component. Furthermore, the complex numbers can be provided as amplitudes of cosinusoidal (real component) and sinusoidal oscillations (imaginary component) to be sent out within a block, the frequencies being provided equidistantly distributed in accordance with the equation specified above, the data to be transmitted being combined in blocks.

It should be pointed out that more or fewer than 256 different tones can be transmitted as cosinusoidal or sinusoidal signals which are defined and can be modulated in amplitude and phase, resulting in a correspondingly different number of transformation signals 111a-111n. The first transformation signal is here designated as 111a and the last transformation signal as 111n. The transformation device 110 preferably carries out a fast Fourier transform (FFT) in order to provide a fast transformation from the time domain into the frequency domain.

In a correction device 112, the transformation signals 111a-111n are weighted with a known correction function which is input to the correction device 112. This correction function input into the correction device 112 is preferably but not exclusively an inverse of the channel transfer function of the transmission channel. This makes it possible to compensate for influences of the transmission channel with respect to frequency response, phase etc. so that corrected transformation signals 113a-113n are obtained at the output of the correction device 112. The corrected transformation signals 113a-113n are then supplied to a determining device 116 in which at least one magnitude signal 114 and at least one phase signal 115 or, respectively, a real component and an imaginary component, of a corrected transformation signal is determined.

The magnitude signals 114 and phase signals 115, determined in the determining device, are then decoded by supplying the magnitude signals 114 and the phase signals 115 to a decoding device 117.

In the decoding device 117, decoding according to a coding of the datastream performed in the datastream transmitter 225 (described below) is provided. The decoding device 117 thus outputs a decoded datastream 118 which is finally supplied to a data output device 119 and can be output from there and processed further.

FIG. 1 shows a circuit arrangement for transmitting an analog datastream in which the filter cut-off frequencies 219 and 221, respectively, are adapted during a transmission of discrete multitone symbols 208 as a result of which transient effects are reduced.

A multitone transmitter device 223 supplies a transmit symbol datastream 209 to an interpolation device 214. The interpolation device 214 operates with a symbol rate 120 generated by means of a symbol rate generating device 211, the transmit symbol datastream 209 being interpolated with the symbol rate 120 in order to provide an interpolated symbol datastream 215 at the output of the interpolation device 214. The interpolated symbol datastream 215 is supplied to a first low-pass filtering device 216 where a first filter cut-off frequency 219 is input to the first low-pass filtering device 216 by a first filter cut-off frequency determining device 218.

In the exemplary embodiment of the present invention shown, the first filter cut-off frequency 219 of the first low-pass filtering device 216 can be reprogrammed during a cyclic prefix 212 of a DMT symbol 208, i.e. from higher first filter cut-off frequencies to an actual band limit in order to reduce transient effects in accordance with the invention.

Furthermore, the first low-pass filtering device 216 can be provided as an adaptive filtering device. A transient effect can be reduced further by corresponding oversampling. The filtered symbol datastream 217 output by the first low-pass filtering device 216 is supplied to a digital-analog converter 204 which operates at a first sampling rate 210. The symbol datastream, filtered and converted to form an analog datastream by the digital-analog converter 204, is supplied to a transmission channel 102 via which the analog datastream 101 is transmitted. The transmitted analog datastream 101' provided at the output of the transmission channel 102 is supplied to an analog-digital converter 104 which operates at a second sampling rate 108. In the analog-digital converter 104, the transmitted analog datastream 101' is converted into a digital symbol datastream which is then supplied to a second low-pass filtering device 105.

According to the invention, a second filter cut-off frequency of the second low-pass filtering device can be variably adjusted. In particular, the second filter cut-off frequency 221 is provided via a second filter cut-off frequency determining device 220 and supplied to the second low-pass filtering device 105. According to the invention, the second filter cut-off frequency 221 of the second low-pass filtering device 105 can be reprogrammed during the cyclic prefix 212, i.e. varied from higher second filter cut-off frequencies 221 to the actual band limit, in order to reduce transient effects.

Furthermore, it is possible that the second low-pass filtering device 105 is constructed as an adaptive filter as a result of which adaptive filtering is achieved. The transient effect can be minimized further by corresponding oversampling in the decimation path. An equalized symbol datastream 106 output by the second low-pass filtering device 105 is supplied to a decimation device 107 which generates from the equalized symbol datastream 106 a decimated received symbol datastream 109 consisting of discrete multitone symbols 208.

The received symbol datastream 109 generated is supplied to a multitone receiver device 222 in which an analysis and further processing of the received symbol datastream 109 is performed.

The low-pass filtering devices 216 and 105, respectively, shown in FIG. 1, can be constructed as adaptive filtering devices in such a manner that filtering beginning from a high filter cut-off frequency toward a lower filter cut-off frequency is provided.

The first and second low-pass filtering devices 216 and 105 respectively are advantageously designed in such a manner that the low-pass filtering devices settle rapidly. The first low-pass filtering device 216 can also be constructed as a first filtering device reprogrammed in the first filter cut-off frequency 219 whereas the second low-pass filtering device 105 can be constructed as a second filtering device reprogrammable in the second filter cut-off frequency 221.

Reference is made to the introduction to the description with respect to the conventional circuit arrangement for transmitting discrete multitone symbols, shown in FIG. 4.

Although the present invention has been described above by means of preferred exemplary embodiments, it is not restricted to these but can be modified in various ways.

What is claimed is:

1. A method for adapting filter cut-off frequencies for the transmission of discrete multitone symbols, comprising the following steps:
   a) applying a transmit symbol datastream consisting of discrete multitone symbols, which is provided by a multitone transmitter device, to an interpolation device;
   b) interpolating the transmit symbol datastream with a symbol rate in the interpolation device to provide an interpolated symbol datastream;
   c) low-pass filtering of the interpolated symbol datastream in a first low-pass filtering device according to a first filter cut-off frequency, which is predetermined by a first filter cut-off determining device, to provide a filtered symbol datastream;
   d) converting the filtered symbol datastream into an analog datastream in a digital-analog converter;
   e) transmitting the analog datastream via a transmission channel;
   f) converting the transmitted analog datastream into a digital symbol datastream in an analog-digital converter;

g) low-pass filtering the digital symbol datastream in a second low-pass filtering device in accordance with a second filter cut-off frequency, which is predetermined by a second filter cut-off frequency determining device, to provide an equalized symbol datastream;

h) decimating the equalized symbol datastream in a decimation device to provide a decimated received symbol datastream having discrete multitone symbols; and i) delivering the received symbol datastream to a multitone receiver device;

wherein at least one of the first and the second filter cut-off frequency of the first and the second low-pass filtering device, respectively, is changed during a cyclic prefix of a DMT symbol.

2. The method as claimed in claim 1, wherein the first filter cut-off frequency, which is predetermined by the first filter cut-off frequency determining device, is variably adjusted during low-pass filtering of the interpolated symbol datastream in the first low-pass filtering device.

3. The method as claimed in claim 1, wherein the first filter cut-off frequency, which is predetermined by the first filter cut-off frequency determining device, is adaptively adjusted in accordance with the multitone symbol to be transmitted, during low-pass filtering of the interpolated symbol datastream in the first low-pass filtering device.

4. The method as claimed in claim 1, wherein the second filter cut-off frequency, which is predetermined by the second filter cut-off frequency determining device, is variably adjusted in the second low-pass filtering device during low-pass filtering of the digital symbol datastream.

5. The method as claimed in claim 1, wherein the second filter cut-off frequency, which is predetermined by the second filter cut-off frequency determining device, is adaptively adjusted in the second low-pass filtering device during low-pass filtering of the digital symbol datastream.

6. The method as claimed in claim 1, wherein the filtered symbol datastream is oversampled with a sampling rate during a conversion of the filtered symbol datastream into the analog datastream in the digital-analog converter.

7. The method as claimed in claim 1, wherein the transmitted analog datastream is oversampled with a sampling rate during conversion of the transmitted analog datastream to the digital symbol datastream in the analog-digital converter.

8. The method as claimed in claim 1, wherein the first filter cut-off frequency of the first low-pass filtering device is changed during a cyclic prefix of a DMT symbol.

9. The method as claimed in one of claim 1, wherein the second filter cut-off frequency of the second low-pass filtering device is changed during the cyclic prefix.

10. A circuit arrangement for adapting filter cut-off frequencies during transmission of discrete multitone symbols, in which transient effects are reduced, comprising the following:

a) a multitone transmitter device for providing a transmit symbol datastream having discrete multitone symbols;

b) an interpolation device for interpolating the transmit symbol datastream having discrete multitone symbols, to provide an interpolated symbol datastream;

c) a first filter cut-off frequency determining device for providing a first filter cut-off frequency;

d) a first low-pass filtering device for low-pass filtering of the interpolated symbol datastream in accordance with the first filter cut-off frequency predetermined by the first filter cut-off frequency determining device, to provide a filtered symbol datastream;

e) a digital-analog converter for converting the filtered symbol datastream to an analog datastream;

f) a transmission channel for transmitting the analog datastream;

g) an analog-digital converter for converting the transmitted analog datastream to a digital symbol datastream;

h) a second filter cut-off frequency determining device for providing a second filter cut-off frequency;

i) a second low-pass filtering device for low-pass filtering of the digital symbol datastream on the basis of a second filter cut-off frequency predetermined by the second filter cut-off frequency determining device, to provide an equalized symbol datastream;

j) a decimation device for decimating the equalized symbol datastream in order to provide a decimated received symbol datastream having discrete multitone symbols; and k) a multitone receiver device for further processing of the received symbol datastream;

wherein at least one of the first and the second filter cut-off frequency determining devices is configured to change at least one of the first and second filter cut-off frequency of the first and the second low-pass filtering device, respectively, during a cyclic prefix of a DMT symbol.

11. The circuit arrangement as claimed in claim 10, wherein the first low-pass filtering device is constructed as a first adaptive filtering device.

12. The circuit arrangement as claimed in claim 10, wherein the second low-pass filtering device is a second adaptive filtering device.

13. The circuit arrangement as claimed in claim 11, wherein the second low-pass filtering device is a second adaptive filtering device.

14. The circuit arrangement as claimed in claim 10, wherein the first low-pass filtering device is constructed as a first filtering device which can be reprogrammed in the first filter cut-off frequency.

15. The circuit arrangement as claimed in claim 11, wherein the first low-pass filtering device is constructed as a first filtering device which can be reprogrammed in the first filter cut-off frequency.

16. The circuit arrangement as claimed in claim 12, wherein the first low-pass filtering device is constructed as a first filtering device which can be reprogrammed in the first filter cut-off frequency.

17. The circuit arrangement as claimed in claim 11, wherein the second low-pass filtering device is constructed as a second filtering device which can be reprogrammed in the second filter cut-off frequency.

18. The circuit arrangement as claimed in claim 12, wherein the second low-pass filtering device is constructed as a second filtering device which can be reprogrammed in the second filter cut-off frequency.

19. The circuit arrangement as claimed in claim 13, wherein the second low-pass filtering device is constructed as a second filtering device which can be reprogrammed in the second filter cut-off frequency.

* * * * *